July 3, 1951
R. L. WILCOX
2,559,140
MEANS FOR MAKING SOCKETED HEAD
SCREW BLANKS OR THE LIKE
Filed April 21, 1945
3 Sheets-Sheet 1
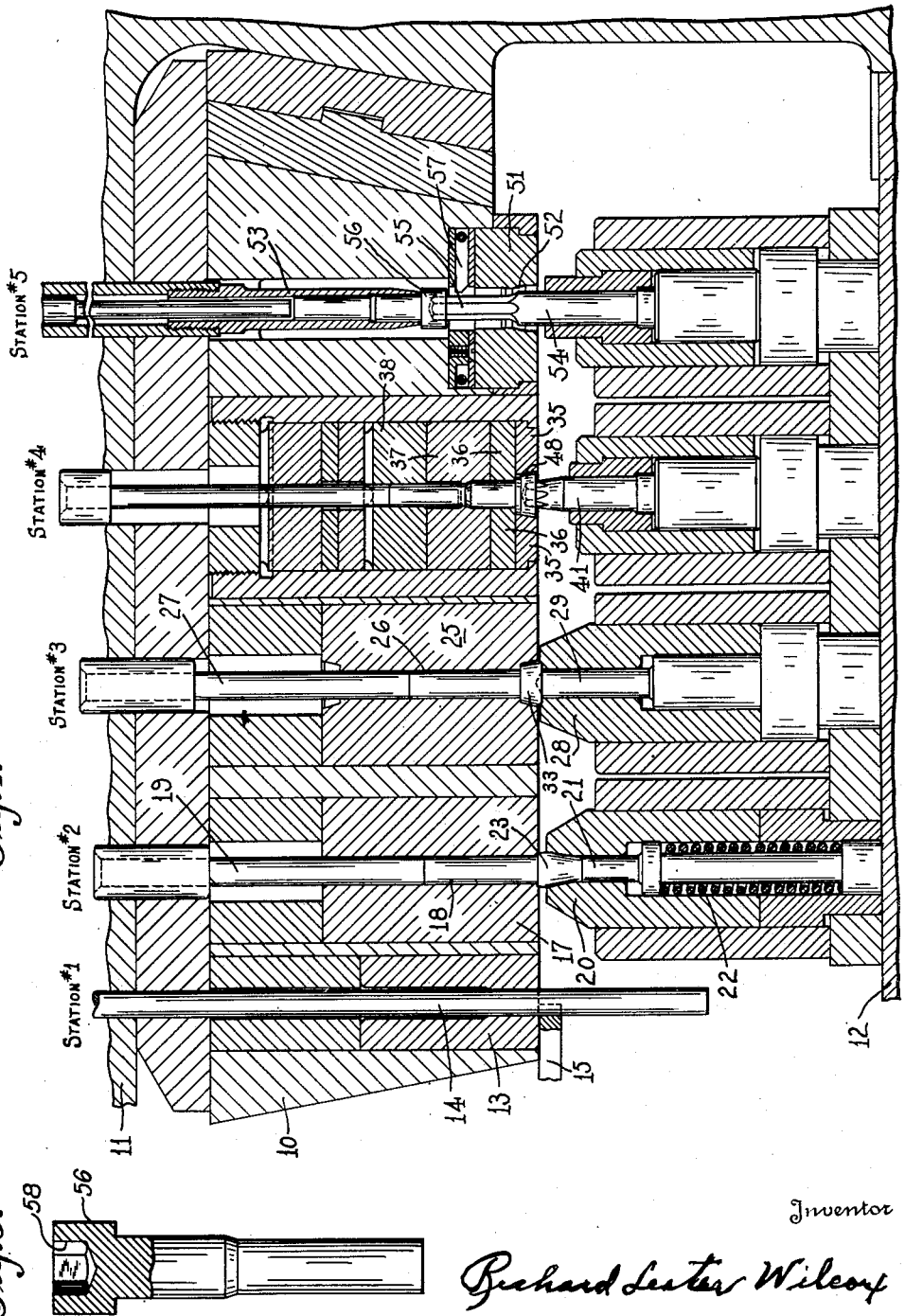

July 3, 1951
R. L. WILCOX
2,559,140
MEANS FOR MAKING SOCKETED HEAD
SCREW BLANKS OR THE LIKE
Filed April 21, 1945
3 Sheets-Sheet 2
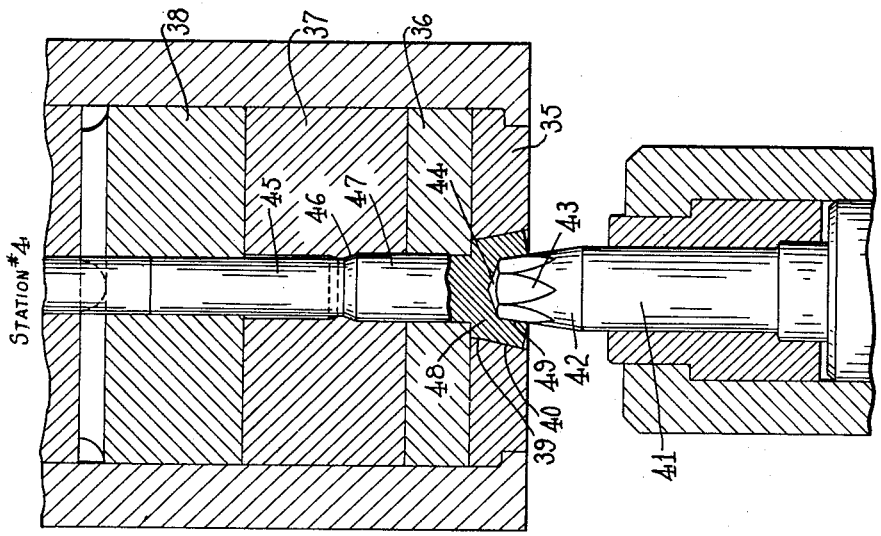
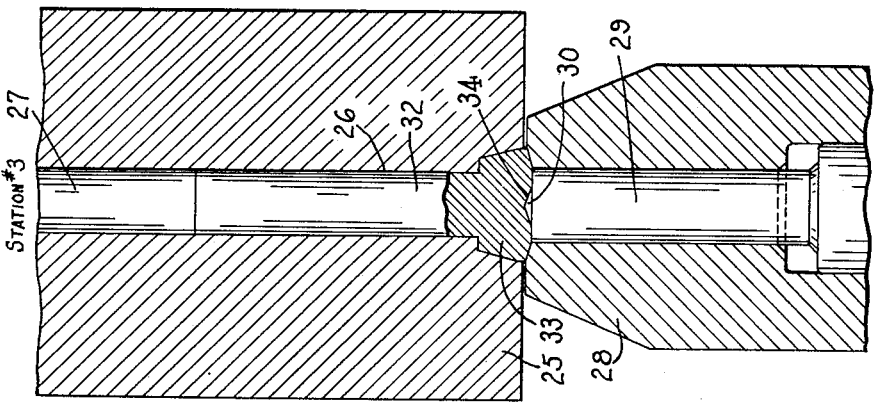
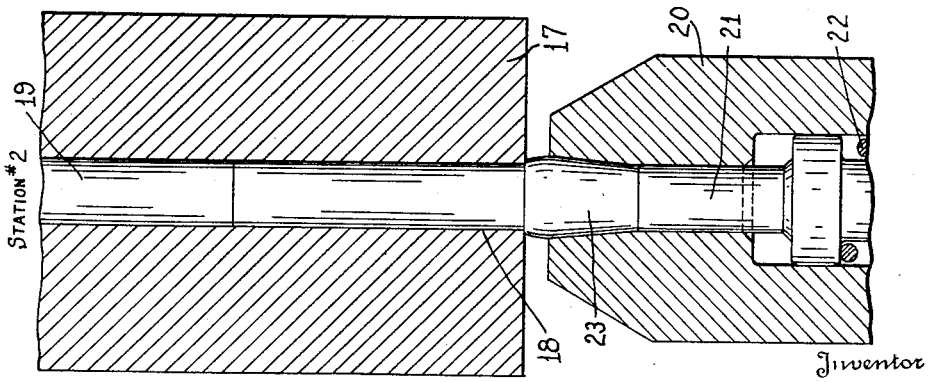
Inventor
Richard Lester Wilcox
By Rockwell & Bartholow
Attorneys July 3, 1951
R. L. WILCOX
2,559,140
MEANS FOR MAKING SOCKETED HEAD SCREW BLANKS OR THE LIKE
Filed April 21, 1945
3 Sheets-Sheet 3
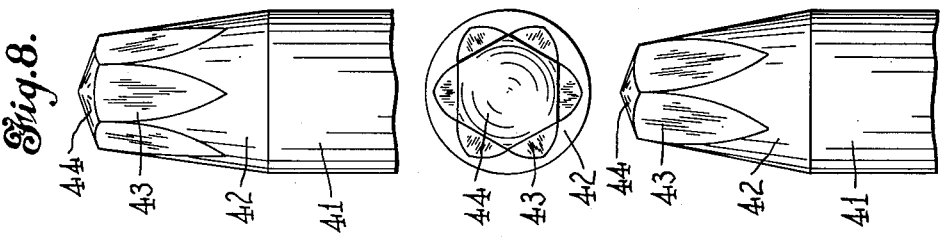
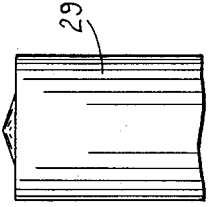
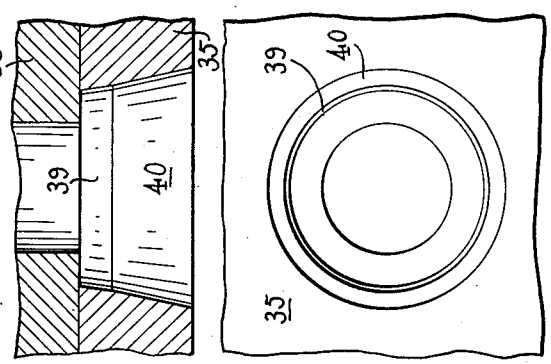
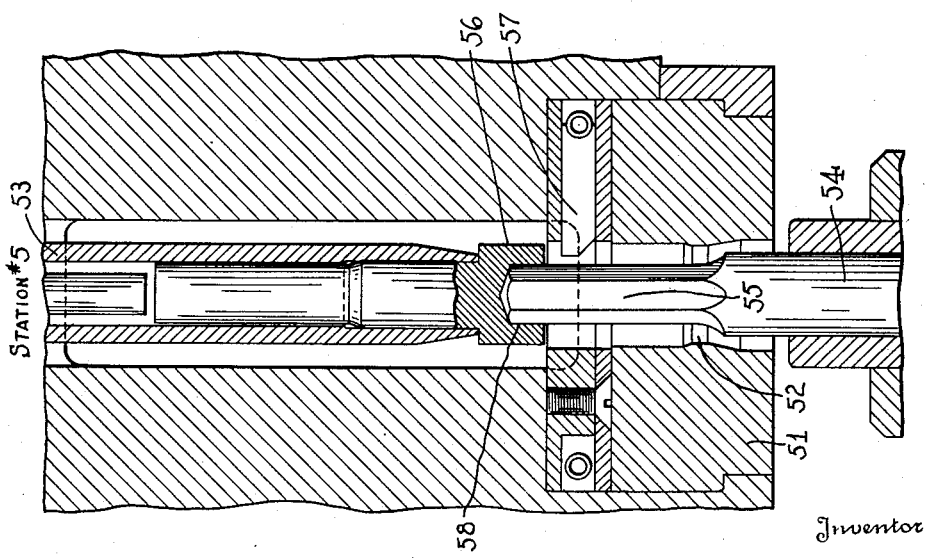
Inventor
Richard Lester Wilcox
By Rockwell & Bartholow
Attorneys Patented July 3, 1951

2,559,140

UNITED STATES PATENT OFFICE 2,559,140

MEANS FOR MAKING SOCKETED HEAD SCREW BLANKS OR THE LIKE

Richard Lester Wilcox, Waterbury, Conn., assignor to The Waterbury Farrel Foundry and Machine Company, Waterbury, Conn., a corporation of Connecticut Application April 21, 1945, Serial No. 589,635

2 Claims. (Cl. 10—12)

This invention relates to a method of producing screw blanks having socketed heads thereon and to a machine adapted to carry out the novel method and produce the blanks by a plurality of operations performed at successive stations in the machine, the blank being advanced from one station to another between operations, and the several operations being performed on separate workpieces simultaneously.

The invention relates particularly to the forming of a screw blank of the character referred to from a length of solid stock, and the operations are performed thereon without the application of heat, the finished blank being produced with a minimum number of operations and without waste of material. It is particularly contemplated by the present invention to prepare the blank at one station for the operation to be performed at a succeeding station, so that the amount of work required at the latter station will be reduced and the tools properly seated or guided with relation to the work, whereby the performing of the various operations in the same machine is greatly facilitated, and the likelihood of rupturing or otherwise damaging the workpiece is greatly reduced.

One object of the invention is to provide a novel method of forming screw blanks with socketed heads.

A further object of the invention is to provide a novel machine by which screw blanks having socketed heads may be automatically formed in a single machine at a plurality of stations, the workpiece being transferred from one station to another under control, whereby the blank will be automatically formed by a plurality of operations without removal from the machine.

A still further object of the invention is to provide a novel machine for carrying out my improved process and automatically effecting the formation of screw blanks having socketed heads, the machine performing a plurality of separate operations on different blanks simultaneously.

To these and other ends the invention consists in the novel features and combinations of parts to be hereinafter described and claimed.

In the accompanying drawings:

Fig. 1 is a horizontal sectional view through the machine showing the tools at the various stations therein;

Fig. 2 is an enlarged sectional view of the tool employed at station #2;

Figs. 3, 4 and 5 are enlarged sectional views of the tools employed at stations #3, #4, and #5, respectively;

Fig. 6 is an enlarged detail view of the working end of the punch employed at station #3;

Fig. 7 is a sectional and top plan view of the die employed at station #4;

Fig. 8 illustrates in side elevational and plan views the punch employed at station #4;

Fig. 9 is an elevational view of the finished blank shown partly in section.

To illustrate a preferred embodiment of a machine of carrying out my improved process, I have shown in Fig. 1 of the drawings a screw former or header comprising a die block 10 suitably supported in the machine frame 11 and a gate 12 which, as usual, is movably mounted on the frame, the die block being illustrated as having a plurality of stations therein, five in number as shown, at which stations a workpiece is operated upon by cooperating tools to perform successive operations upon the workpiece which is transferred successively from one station to another.

At the first station a cut-off die 13 is mounted in the die block, and through this die is projected the end of a length of bar stock 14 to be cut off by the knife 15, which severed piece forms the workpiece out of which the screw blank is made.

The workpiece is then transferred to the second station. At this station, a die 17 is supported in the die holder, the die being provided with an opening 18 to receive the workpiece and a knock-out rod 19 which forms the bottom of this opening. At this station, the gate is provided with a punch 20 and a pin 21 movably mounted therein, the pin being urged forwardly by the spring 22.

It will be understood that the workpiece cut from the length of stock is transferred to this second station by the knife 15 to a position in line with the opening 18. The gate is then advanced at which time the workpiece will be acted upon by the punch 20 and pin 21 so as to form a partial head or cone-shaped portion 23 upon the workpiece shown more particularly in Fig. 2.

This coned workpiece is then transferred to the third station, at which station the die block is provided with a die 25 having an opening 26 therein closed at its rear end by the knock-out pin 27. The gate at this station is provided with a punch 28 having mounted therein a pin 29, this pin being provided with a sharply coned end 30 (Fig. 3), which may be termed a prick punch, to form an indentation in the face of the blank. It will also be noted that the opening 26 in the die 25 is enlarged at its upper end so that a head will be formed at the outer end of the workpiece.

When the workpiece has been transferred by suitable transfer mechanism (not shown) from station #2 to station #3, it is seated in the die opening 26 against the pin 27 by the advance of the gate, the outer end of the workpiece being engaged by the punch 28 and the coned end 30 of the pin 29. The result of this operation is shown more particularly in Fig. 3 where it will be observed the workpiece has a substantially cylindrical body portion 32 and a head 33 having a tapered or flaring outer wall, the face of the head being indented as shown at 34. This indentation or prick punch 34 serves an important function in that when the blank is transferred to a succeeding station, as will be hereinafter described, the tool at this latter station is formed to fit this recess and thus is properly guided and held in alignment.

The workpiece after being formed at station #3 is then transferred to the fourth station, shown more particularly in Figs. 1 and 4 of the drawings. At this station, the die holder is provided with a heading die 35, a backing die 36, an extruding die 37 and a second backing die 38. The diameter of the heading die at the base of the inner end of the opening therein will preferably be of the same diameter as that desired in the finished blank, so that the lower portion of the head will have the same diameter as the finished blank at the final station. For a short distance outwardly from this point, the wall of the opening tapers substantially 8° as shown at 39, and from this point to the mouth of the opening the taper is substantially 12° as at 40°.

The gate at this station is provided with a punch 41 shown more particularly in Figs. 4 and 8. This punch is provided with a tapered end portion 42 of conical form, the taper being approximately 8° from the cylindrical outline. Adjacent the end of the punch a plurality of flat faces 43 are formed thereon, these faces tapering at an angle of approximately 12° relatively to the cylindrical outline of the punch and are so formed that the outer end of the punch is a substantially true polygon which, as shown, is hexagonal in form. It will be understood, of course, that the number of flat faces or sides on the punch will correspond with the number of flat faces desired in the socket of the head of the finished blank.

When the blank has been transferred to station #4 by suitable transfer mechanism (not shown), it will be forced into the openings of the dies 35 and 37 by the punch 41. It may also be noted that this punch is provided with a sharply coned end portion 44 designed to seat in the indentation 34 formed at station #3. This properly guides the punch into the head of the workpiece and reduces the lateral strain on the punch which would be present if it were required to ride itself into the head, a strain which sometimes results in breaking the punch. When the workpiece is driven into the die, the lower portion of the body thereof is extruded into the die 37, as shown at 45, beyond which end is a tapering shoulder portion 46, and outer body portion 47 which extends to the head 48. The outer wall of the head will, of course, be formed to fill the opening in the die 35 and will acquire the tapering portions complemental to the tapered portions 39 and 40 of the die opening. Also, the end of the punch with the flattened faces 43 will be forced into the head to form a socket 49 therein with partially formed flattened faces. At the lower end, this socket will be substantially hexagonal in shape and of the same dimensions as that desired for the socket in the finished blank.

While the formation of the indentation 34 at station #3 guides the blank centrally when operated upon by the punch 41 and reduces the lateral strain thereon, the formation of the partial flat sided socket at station #4 also greatly reduces the amount of work required in drawing a true hexagonal recess or socket at the next station, as will now be described.

The blank is now transferred to the fifth station under control as to position so that the flattened areas in the socket 49 will register with the polygonal faces of the punch employed at this station. The performance of the operations at station #4 and station #5 in the same machine, so that the position of the blank can be controlled during the transfer from one station to another, makes it possible to partially form the flat sides of the hexagonal socket at station #4 and then complete the formation of the socket at the fifth station.

At the latter station, the die block is provided with a drawing die 51 having therein an opening 52 of the shape required for the exterior of the head of the finished blank, which in the form shown is round. Movably mounted in the die block is a guide bushing 53 which normally stands in a forward position with the forward end thereof substantially flush with the face of the die 51 so that it may receive the shank or lower portion 45 of the blank and guide it centrally with respect to the drawing die as it is forced through the latter.

At this station, the gate is provided with a punch 54 provided with a polygonal end portion 55 designed to enter socket 49 of the blank when the latter is brought into registration with the punch.

With the gate in a retracted position, the blank is transferred from station #4 to station #5 and the punch 54 advanced to force the blank into the die 51. The rear end portion of the blank, as stated, enters the bushing 53 which at this time is in its forward position substantially flush with the inner face of the die 51. Upon continued advance of the punch 54, the head of the blank is drawn through the die opening 52 into true cylindrical shape as shown at 56 (Figs. 5 and 9) and, at the same time that the head is reduced and drawn into cylindrical form, it is also drawn upon the hexagonal portion of the punch 55 so as to perfect the partially hexagonal recess formed at station #4 and slightly elongate this recess and the head portion of the blank.

The parts of the machine are now in the position shown in Figs. 1 and 5. As the gate is retracted, the head 56 of the blank is engaged by the stripper rod 57 and the blank stripped from the punch. At the same time, the guide bushing 53 is caused to recede rapidly so as to permit the blank which is freed from both punch and guide bushings to drop by gravity through the die block and out of the machine. The blank is now in its finished form as shown in Fig. 9, where, as will be seen, it is provided with a true cylindrical head 56 and a hexagonal socket portion 58. The exact exterior shape of the head and the number of faces provided within the socket may, of course, be varied as desired by the shape of the tools employed at stations #4 and #5.

While I have shown and described a preferred embodiment of my invention and a preferred method of carrying out my improved process, it will be understood that the invention is not to be limited to all the details shown, nor the process limited to the particular steps described, but both are capable of modification and variation within the spirit of the invention and the scope of the claims.

What I claim is:

1. Mechanism for forming a screw blank with a socketed head by pressure from cold stock comprising a plurality of companion tools at a plurality of independent stations, the tools at one station comprising means for heading the blank, the tools at another station comprising a die having an outwardly flaring opening to receive the head of the blank, and a tapered punch having flat faces on its side walls with the lower end of the punch being of substantially true polygonal shape to form a tapered socket in the head of the blank with flattened areas on the side walls thereof, and the tools at the succeeding station comprising a drawing die and a straight-sided polygonal punch, said punch being of substantially the same dimensions in cross-section as the lower polygonal end of said first-named punch, and a movable gate member on which both of said punches are carried.

2. Mechanism for forming a screw blank with a socketed head by pressure from cold stock comprising a plurality of companion tools at a plurality of independent stations, the tools at one station comprising means for heading the blank, the tools at another station comprising a die having an outwardly flaring opening to receive the head of the blank, and an extrusion die through which the body of the blank is extruded, and a tapered punch having flat faces on its side walls with the lower end of the punch being of substantially true polygonal shape to form a tapered socket in the head of the blank with flattened areas on the side walls thereof, and the tools at the succeeding station comprising a drawing die and a straight-sided polygonal punch, said punch being of substantially the same dimensions in cross-section as the lower polygonal end of said first-named punch, and a movable gate member on which both of said punches are carried.

RICHARD LESTER WILCOX.

REFERENCES CITED

The following references are of record in the file of this patent:

UNITED STATES PATENTS

| Number | Name | Date |
| --- | --- | --- |
| 960,244 | Allen | June 7, 1910 |
| 1,642,696 | Rateike | Sept. 20, 1927 |
| 1,832,167 | Wilcox | Nov. 17, 1931 |
| 1,978,371 | Purtell | Oct. 23, 1934 |
| 2,077,519 | Frayer | Apr. 20, 1937 |
| 2,093,646 | Purtell | Sept. 21, 1937 |
| 2,151,776 | Koester | Mar. 28, 1939 |
| 2,261,067 | Lovisek | Oct. 28, 1941 |